Dec. 24, 1957   E. L. HARSHBARGER   2,817,176
FISH BITE SIGNALLING MEANS
Filed June 5, 1956   2 Sheets-Sheet 1
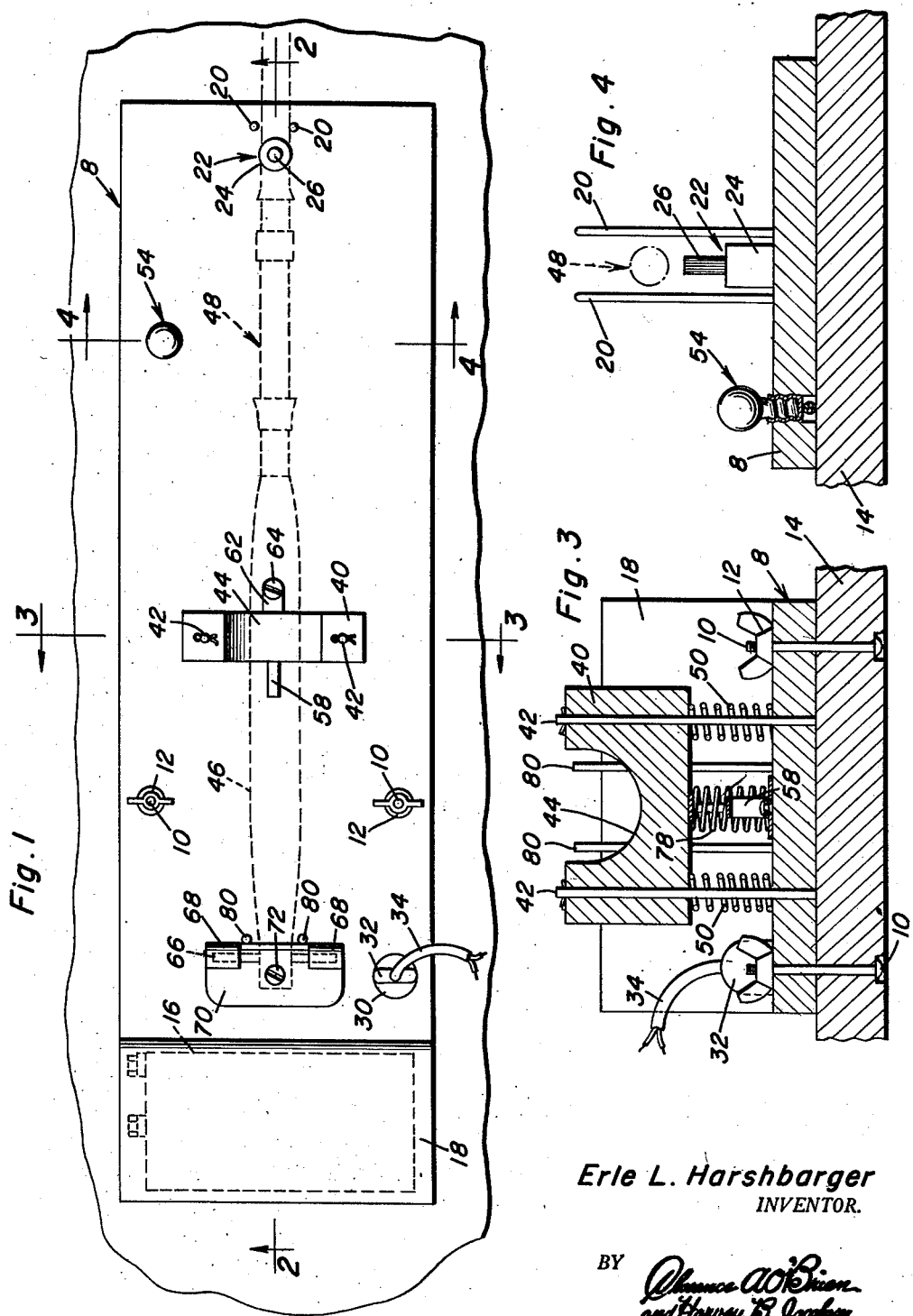
Erle L. Harshbarger
INVENTOR.

Dec. 24, 1957  E. L. HARSHBARGER  2,817,176
FISH BITE SIGNALLING MEANS
Filed June 5, 1956  2 Sheets-Sheet 2
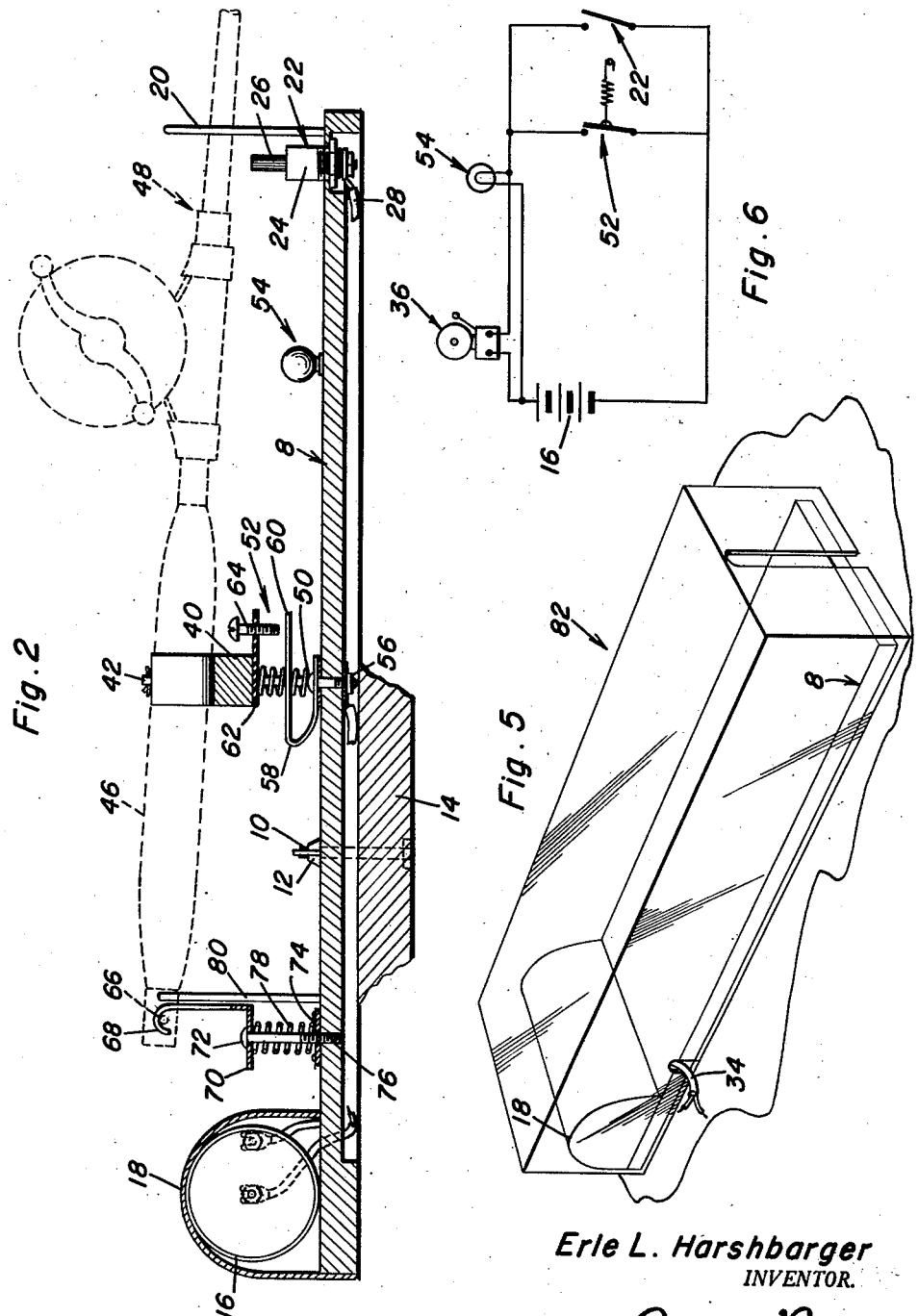
Erle L. Harshbarger
INVENTOR.

United States Patent Office 2,817,176
Patented Dec. 24, 1957

2,817,176

FISH BITE SIGNALLING MEANS

Erle L. Harshbarger, Galesburg, Ill.

Application June 5, 1956, Serial No. 589,408

3 Claims. (Cl. 43—17)

The present invention relates to a device of a portable nature which may be mounted on a boat, wharf or the like, which is provided with simple mechanical means for releasably supporting a fishing rod in an angling position and is characterized by novel means which gives a visible or an audible signal and thus tips off the fisherman and lets him know that a fish has taken the baited hook.

An object of the invention is to contribute to and advance the art to which the invention relates, to provide a simple, practical and efficient holder which embodies novel rod supporting means and switches which come into play when the fish exerts a pull on the fishing line and thus tiltably moves the fishing rod or pole, as the case may be.

In carrying out the invention a wooden or an equivalent panel serves as a base. This is adapted to be bolted on a relatively stationary foundation, boat, wharf or the like. Intermediate its ends the base is provided with a perch for the handle portion of the rod, said perch having a saddle and a novel circuit make and break device or switch connected thereto which, under ordinary circumstances, serves to function intermittently and to thus flash a signalling light, affording the fisherman a tip-off bite signal.

Another object of the invention has to do with the construction stated and the combination therewith of an anchoring and hold-down device also on the base and spaced from the perch and in line therewith and characterized by a simple bracket with hold-down hooks cooperating with a retaining pin which is preferably driven through the butt of the handle forwardly of the butt, as will be hereinafter clarified.

In addition, novelty is predicated on a second switch on the base forwardly of the perch and preferably in proper alignment so that when a cooperating portion of the fishing rod or pole is pushed down against the switch it is closed and, assuming that the pull is strong, stays closed and provides a second signal, for example, a bell located either on the base or, if preferred, at some nearby point of operation of the fisherman.

Other objects, features and advantages will become more readily apparent from the following description and the accompanying sheet of illustrative, but not restrictive, drawings.

In the accompanying drawings:

Fig. 1 is a plan view, approximately full size, of the improved fish bite signalling means showing the cover removed and the fishing rod or pole in dotted lines;

Fig. 2 is a section on the central longitudinal line 2—2 of Fig. 1;

Figs. 3 and 4 are cross-sections on the lines 3—3 and 4—4 of Fig. 1;

Fig. 5 is a perspective view, smaller scale, showing the cover with parts omitted to simplify presentation; and Fig. 6 is a small scale wiring diagram.

The base comprises a panel of general rectangular form denoted by the numeral 8 and secured by bolts 10 and nuts 12 to a wharf, boat or other foundation 14. At the left hand end, the so-called inner end, a suitable dry cell or battery 16 is mounted in an appropriate protective case or housing 18. At the forward end at the right are upstanding spaced parallel positioning and confining rods 20 for the fishing pole or rod and inwardly of these there is a suitable switch 22 which for convenience is referred to as an audible signal switch. This comprises an appropriate spring loaded or equivalent case 24 and a plunger-type contact 26. The conductor 28 will be suitably cooperable with a receptacle 30 (Fig. 1) which in turn will accommodate a plug 32 and a current take-off conductor or wire 34 leading to a so-called remote audible signal, for example the bell 36 (Fig. 6). This is of course an optional signal.

On the intermediate portion of the base is the aforementioned perch means. More specifically, this comprises a floating block 40 slidably mounted on pins 42 fixed to the base in spaced parallel relationship with the upper edge of the block formed with a semi-circular notch 44 constituting a seat. The block is actually a saddle for the handle portion 46 of the fishing rod 48. Cushioning and return springs, simple coil springs, are provided as at 50 and surround the pins and are interposed between the bottom of the block and the top surface of the base. Here a suitable rod operated switch 52 is provided. This switch serves to operate the audible signal, the simple bulb or lamp 54 suitably mounted on the base. A binding post 56 is provided with a substantially U-shaped spring clip 58, the upper springy arm 60 being a suitable resilient contact element. Above it and fastened to the block there is a metal clip 62 having a projecting finger carrying an adjustable set-screw 64 which is movable toward and from the contact finger 60 whereby to thus provided an adjustable switch, that is, one in which the gap may be regulated as desired.

The butt end of the handle is provided with an anchoring pin 66 which passes through the handle and which has its end portions releasably engaged beneath hold-down hooks 68 on a bracket 70, said bracket being slidable on a headed screw 72 screwed into an adjusting and attaching cleat 74 at its screw threaded end 76 as shown in Fig. 2. A coil spring 78 surrounds the bolt and is interposed between the cleat and the bracket to keep the bracket up. Additional stabilizing and positioning rods or pins 80 are provided and are fastened in the base and located between the hooks 68, 68 as brought out in Fig. 1. In fact, this figure brings out the fact that the two switches are in spaced longitudinal alignment, that the saddle and hold-down means are properly lined up. Any pull on the line attached to the pole caused by a fish nibbling on the baited hook will move the pole and tilt or tip the same and the movement of the pole will close either one or both switches. A like pull will produce intermittent operation of the switch means 52, thus flashing the light bulb. A strong pull will exert a downward stress on the rod which will in turn close the switch 22 and if the pull is steady the switch will remain closed, thus giving the audible or bell signal. The invention may be operated to provide either one or both signals as is obvious.

The hold-down means or bracket, spring suspended saddle and positioning rods are all properly lined up and so constructed and arranged that once the signal is given the fisherman may have access to the rod or pole to catch hold of it and expeditiously angle for his catch.

Reverting to Fig. 5 it will be noted that a suitable plastic or an equivalent rainproofing cover or shield 82 may be provided and used if and when desired.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for use in mechanically holding a fishing rod in a readily accessible and removable position and providing and at the same time, audible and visible signals singly or collectively; comprising a portable base horizontally elongated in form, a spring elevated and pull actuated saddle mounted on said base for readily removable reception of a portion of the handle of the fishing rod, an electrically operable signal mounted for operation on said base, a circuit make and break switch interposed between said saddle and base and electrically connectible with said signal for operating the same, and rod hold-down means on the base in line with said saddle, said means embodying a movably mounted bracket, a bolt connected with and attaching said bracket adjustably to said base, a coil spring surrounding said bolt and interposed between the base and bracket, said bracket having a pair of coplanar spaced apart down-turned hook-like hold-down fingers, said fishing rod being provided with hold-down pin means releasably engageable beneath the hook-like portions of said hold-down fingers, said switch comprising a resilient contact member anchored on the base directly beneath and spaced below said saddle, and a companion contact member carried by said saddle and provided with an adjustable setscrew engageable with said first named contact member.

2. The structure defined in claim 1, and in combination, a second switch mounted on said base in advance of and in longitudinal alignment with said saddle and adapted to operate a second signal, and upstanding spaced parallel vertical guide and confining rods adjacent to and in cooperative association with said second switch for receiving an adjacent cooperating portion of said fishing rod.

3. A fishing rod holder and signalling device comprising a portable base panel, a pair of spaced parallel pins mounted atop an intermediate portion of said panel, a block slidable on said pins and having an unobstructed seating notch in its top providing a seating saddle for a fishing rod, coil springs surrounding the pins and interposed between the bottom of the block and the top of the panel, a substantially U-shaped contact element mounted on said panel between said pins and coil springs and beneath said block and having a resilient arm providing a first resilient contact element, a second contact element fixed to the bottom of said block and provided with an accessible manually adjustable setscrew engageable with said first named contact element, a signal mounted for operation on said base panel and associated for operation with said contact elements, a bolt mounted on said panel in cooperative alignment with said block, a coil spring encircling the bolt, and a bracket slidably mounted on said bolt, said coil spring being interposed between the bracket and panel, and said bracket having upstanding fingers provided with hooked upper ends serving as hold-down members for said rod.

References Cited in the file of this patent
UNITED STATES PATENTS

| | | |
|---|---|---|
| 371,777 | McCabe | Oct. 18, 1887 |
| 522,352 | Poppowitsch | July 3, 1894 |
| 2,314,747 | White | Mar. 23, 1943 |
| 2,603,900 | Kellett | July 22, 1952 |
| 2,645,050 | Golias | July 14, 1953 |
| 2,720,048 | Bracey | Oct. 11, 1955 |